US010223186B2

(12) United States Patent
Hollaway, Jr. et al.

(10) Patent No.: US 10,223,186 B2
(45) Date of Patent: Mar. 5, 2019

(54) COHERENCY ERROR DETECTION AND REPORTING IN A PROCESSOR

(71) Applicant: International Business Machines Corporation, Armonk, NY (US)

(72) Inventors: John T. Hollaway, Jr., Austin, TX (US); Charles F. Marino, Round Rock, TX (US); Michael S. Siegel, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 15/422,202

(22) Filed: Feb. 1, 2017

(65) Prior Publication Data
US 2018/0217890 A1    Aug. 2, 2018

(51) Int. Cl.
*G06F 11/07*      (2006.01)
*G06F 12/0811*    (2016.01)

(52) U.S. Cl.
CPC ...... *G06F 11/0778* (2013.01); *G06F 11/0724* (2013.01); *G06F 11/0751* (2013.01); *G06F 12/0811* (2013.01); *G06F 2212/60* (2013.01); *G06F 2212/62* (2013.01)

(58) Field of Classification Search
CPC ............................ G06F 11/0724; G06F 11/073
USPC ..................................................... 714/6.1, 49
See application file for complete search history.

(56) References Cited

U.S. PATENT DOCUMENTS

2005/0160232 A1* 7/2005 Tierney ............... G06F 12/0831
                                                          711/141
2005/0160238 A1* 7/2005 Steely, Jr. ........... G06F 12/0831
                                                          711/145
2005/0198192 A1* 9/2005 Van Doren ......... G06F 12/0815
                                                          709/217
2007/0050559 A1* 3/2007 Alsup .................. G06F 9/3004
                                                          711/145
2010/0205378 A1* 8/2010 Moyer ................ G06F 12/0831
                                                          711/146

(Continued)

FOREIGN PATENT DOCUMENTS

EP        2244189 A1 * 10/2010 ......... G06F 12/0831

OTHER PUBLICATIONS

Delzanno, Giorgio "Automatic Verification of Parameterized Cache Coherence Protocols", 12th Int'l Conf. of Computer Aided Verification, pp. 53-68, Jul. 2000.

(Continued)

*Primary Examiner* — Chae M Ko
(74) *Attorney, Agent, or Firm* — Martin & Associates, LLC; Derek P. Martin

(57) ABSTRACT

A coherency error detection and reporting mechanism monitors for coherency errors in a processor and between processors. When a requestor broadcasts a memory address in a command and a coherency error is detected, information regarding the command that caused the coherency error is logged, and the coherency error is reported a system error handler. The information logged for the coherency error may include the address of the coherency error, the requestor, the command, the response to the command, the scope of the coherency error, the error type, etc. Logging information relating to the coherency error provides more information to a person analyzing the processor for failures to more easily track down the cause of coherency errors.

18 Claims, 4 Drawing Sheets

(56) References Cited

U.S. PATENT DOCUMENTS

| | | | | |
|---|---|---|---|---|
| 2012/0110396 A1* | 5/2012 | Jaubert | ............... | G06F 11/1064 |
| | | | | 714/54 |
| 2012/0151251 A1* | 6/2012 | Donley | ................ | G06F 11/079 |
| | | | | 714/6.1 |
| 2013/0031420 A1* | 1/2013 | Haverkamp | ........ | G06F 11/3656 |
| | | | | 714/45 |
| 2014/0040676 A1* | 2/2014 | Solihin | ............... | G06F 11/1612 |
| | | | | 714/54 |
| 2014/0052905 A1* | 2/2014 | Lih | ..................... | G06F 12/0831 |
| | | | | 711/105 |
| 2014/0089593 A1* | 3/2014 | Vera | ........................ | G06F 11/08 |
| | | | | 711/133 |
| 2014/0229685 A1* | 8/2014 | Blaner | ................ | G06F 12/0831 |
| | | | | 711/146 |
| 2014/0281190 A1* | 9/2014 | Kaushikkar | ........... | G06F 9/4411 |
| | | | | 711/105 |
| 2014/0380085 A1* | 12/2014 | Rash | ................... | G06F 11/0772 |
| | | | | 714/3 |

OTHER PUBLICATIONS

Lenoski et al., "The Directory-Based Cache Coherence Protocol for the DASH Multiprocessor", ISCA '90 Proceedis of the 17th Annual Int'l Symposium on Computer Architecture, vol. 18, Issue 1SI, p. 148-159, Jun. 1990.

Sorin et al., "Specifying and Verifying a Broadcast and a Multicast Snooping Cache Coherence Protocol", IEEE Transaction on Parallel and Distributed Systems, Vo. 13, No. 6, pp. 556-578, Jun. 2002.

Starke et al., "The cache and memory subsystems of the IBM POWER8 processor", IBJ J. Res. & Dev., vol. 59, No. 1, Paper 3, Jan./Feb. 2015.

* cited by examiner

| Coherency Error Data | |
|---|---|
| Power8 | Mechanism 142 in FIG. 1 |
| Single bit that indicates a coherency error occurred. | Bit set in scan latch of interface |
| | Logged Command Info: Address Requestor Command Response Scope Error Type |
| | Log Error in FIR |

COHERENCY ERROR DETECTION AND REPORTING IN A PROCESSOR

BACKGROUND

1. Technical Field

This disclosure generally relates to processors, and more specifically relates to coherency error detection and reporting in processors.

2. Background Art

Processor architectures and systems have become very sophisticated. Most modern processors include multiple cores with multiple levels of cache. Multi-processor systems allow multiple processors to work together. For a given memory location, data may exist in multiple locations in the processor and/or in multiple processors. Coherency mechanisms have been developed that assure coherency of data between processors. Known coherency mechanisms set a bit to report when a coherency error occurs, such as when two processors both claim to own the same memory location. However, the process for identifying where the coherency error occurred and why is still a highly manual process.

BRIEF SUMMARY

A coherency error detection and reporting mechanism monitors for coherency errors in a processor and between processors. When a requestor broadcasts a memory address in a command and a coherency error is detected, information regarding the command that caused the coherency error is logged, and the coherency error is reported a system error handler. The information logged for the coherency error may include the address of the coherency error, the requestor, the command, the response to the command, the scope of the coherency error, the error type, etc. Logging information relating to the coherency error provides more information to a person analyzing the processor for failures to more easily track down the cause of coherency errors.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

A coherency error detection and reporting mechanism monitors for coherency errors in a processor and between processors. When a requestor broadcasts a memory address in a command and a coherency error is detected, information regarding the command that caused the coherency error is logged, and the coherency error is reported a system error handler. The information logged for the coherency error may include the address of the coherency error, the requestor, the command, the response to the command, the scope of the coherency error, the error type, etc. Logging information relating to the coherency error provides more information to a person analyzing the processor for failures to more easily track down the cause of coherency errors.

Figure 1:
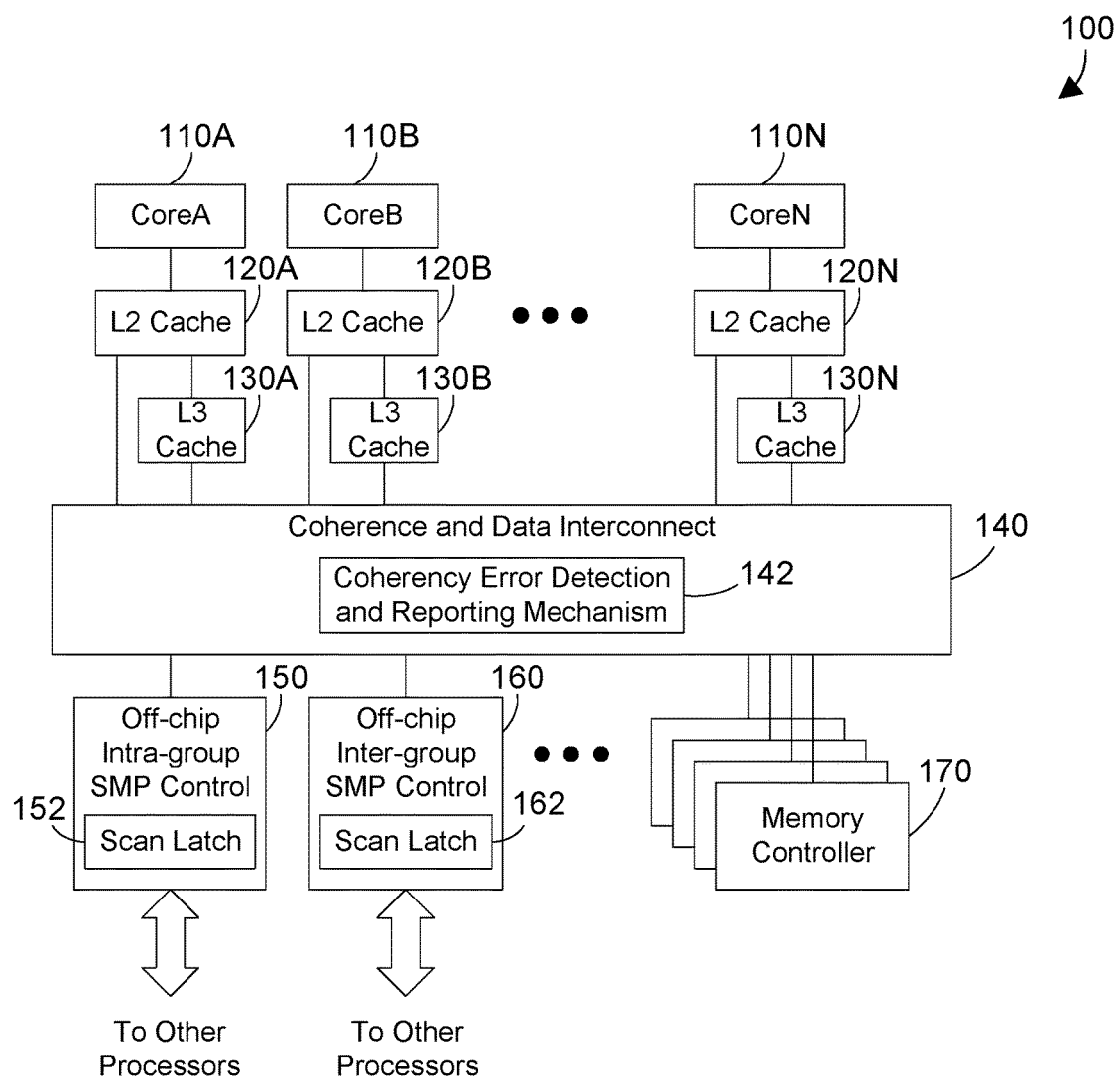
FIG. 1 is a simplified block diagram of a portion of a multi-core processor.

Referring to FIG. 1, a portion of a processor 100 is shown. Note that processor 100 in FIG. 1 is very simplified for the purpose of discussing the concepts herein. Processor 100 includes multiple cores, shown in FIG. 1 as coreA 110A, coreB 110b, . . . , coreN, 110N. Each core has its own level 2 (L2) and level 3 (L3) cache. Thus, core 110A has corresponding L2 cache 120A and L3 cache 130A; core 110B has corresponding L2 cache 120B and L3 cache 130B; and so on, with coreN 110N having corresponding L2 cache 120N and L3 cache 130N. The processor 100 also include an off-chip intra-group symmetric multiprocessor (SMP) control interface 150 and an off-chip inter-group SMP control interface 160. The off-chip intra-group SMP control interface 152 includes a scan latch that has a bit that can be set by the coherency error detection and reporting mechanism 142 to indicate a coherency error. The off-chip inter-group SMP control interface 160 similarly includes a scan latch 162 that has a bit that can be set by the coherency error detection and reporting mechanism 142 to indicate a coherency error. Processor 100 further includes one or more memory controllers 170. All of the different units within the processor 100 that can contain copies of data, or that reference an external processor that can contain copies of data, are interconnected using a coherence and data interconnect 140. The coherence and data interconnect 140 allow detecting coherency errors and reporting that a coherency error occurred.

With some examples, one can easily appreciate how coherency issues arise in a processor such as processor 100 in FIG. 1. Let's assume CoreA 110A performs a load of a memory address controlled by the memory controller 170. The data at that memory address will exist in the memory controller 170, and will also be written to the L3 cache 130A, the L2 cache 120A, and a register within CoreA 110A. Let's assume CoreA 110A performs some operation on the data that changes the data, and these changes are written to the L2 cache 120A. Now let's assume CoreN 110N needs to access the same memory location. The changed value of the data written by CoreA 110A only exists in the L2 cache 120A, it has not yet been propagated to the L3 cache 130A or back to the memory controller 170. If CoreN 110 does a load of the data at that memory location in the memory controller 170, this data will be stale. If both CoreA 110A and CoreN 110N report they own this same memory location, this is a coherency error that can cause a failure, and needs to be reported.

Known processors include coherency error detection logic that detects when a coherency error occurs. However, known coherency mechanisms in known processors simply report the occurrence of a coherency error, and provide no additional information that allows locating and identifying the coherency error that occurred. The processor 100 as disclosed and claimed herein, in contrast, includes a coherency error detection and reporting mechanism 142 that not only reports the occurrence of a coherency error, but reports additional data corresponding to the coherency error so the location and cause of the failure that caused the coherency error can be more quickly identified.

The simple example above could be extended to include other processors connected to the interfaces 150 and 160. Data coherency in a symmetric multiprocessing (SMP) system that includes multiple processors that each have multiple cores becomes a growing problem as the number of cores and processors increases.

Figure 2:
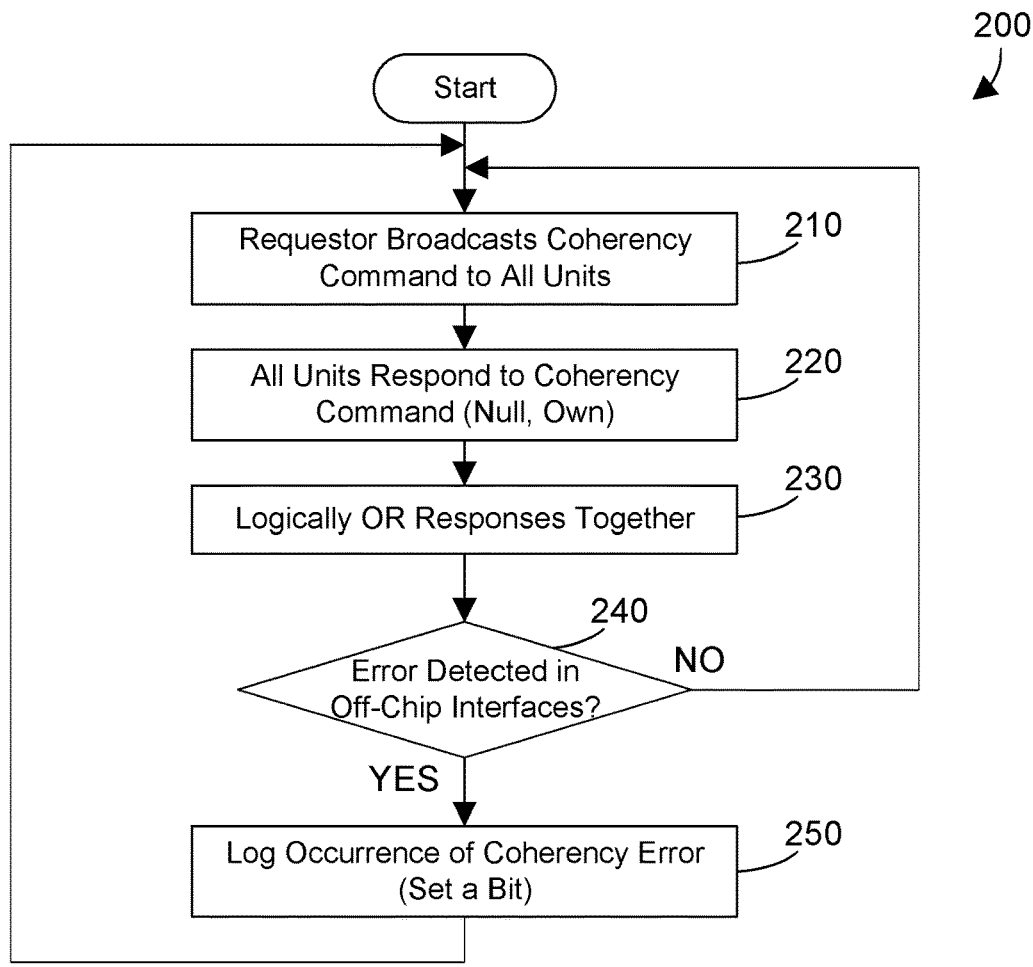
FIG. 2 is a flow diagram of a method for reporting a coherency error by setting a bit.

FIG. 2 shows a flow diagram representative of a method 200 that detects and reports occurrence of an error without reporting any additional information that would help identify where the coherency error occurred or why. Method 200 is representative of a method performed in the Power8 processor developed by IBM. A requestor broadcasts a coherency command to all units (step 210). The coherency command includes an address for data for which coherency needs to be determined. All units respond to the coherency command (step 220). Suitable responses include: null, which indicates the unit does not have ownership of the address; and own, which indicates the unit has ownership of the address. Note that "own" as shown in FIG. 2 may include multiple different types of ownership that depend on the type of unit, and multiple different responses could indicate different aspects of ownership of the address. For the purpose of the discussion herein, all responses that include some indication of ownership, either of the original memory address or of a copy of the data from that memory address in a cache, are grouped under the label "own." The responses from all the units are logically ORed together (step 230). When there is no coherency error detected at any off-chip interfaces (step 240=NO), method 200 loops back to step 210 and continues. When there is a coherency error detected in an off-chip interface (step 240=YES), the occurrence of the coherency is logged by setting a bit (step 250). Note the only errors detected in the Power8 processor as represented in FIG. 2 are errors in off-chip interfaces.

Figure 3:
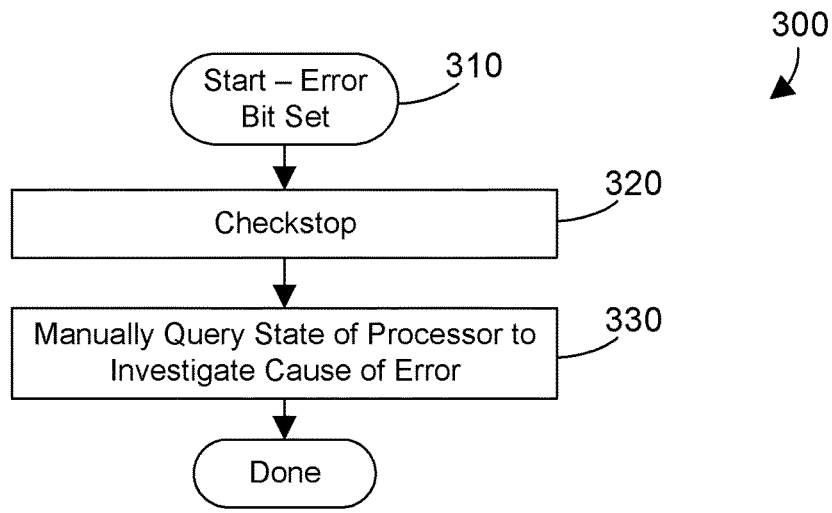
FIG. 3 is a flow diagram of a method for investigating the cause of a coherency error when the error bit is set.

Referring to FIG. 3, a method 300 is preferably performed in response to the error bit being set in step 250 in FIG. 2. Method 300 starts when the error bit is set (step 310) to indicate a coherency error, which occurs in step 250 in FIG. 2. A checkstop is performed (step 320). A checkstop halts execution by the processor and puts the processor in a debug mode where the state of its various units can be queried. Once in a checkstop, a user can manually query the state of various units in the processor to investigate the cause of the error (step 330). Because only the fact that a coherency error occurred was logged by setting the bit in step 250 in FIG. 2, there is no additional information to help inform the user regarding how or where the coherency error occurred, or what address the command was operating on, or who the requestor was. Thus, for the simple example given above, to locate the coherency error, the user would have to query the state of the L2 cache 120A, query the state of the memory controller 170, and query the state of the CoreN 110N. But with no information regarding where the coherency error occurred, the user would likely go through a systematic querying of the state of the various units in processor 110, having to examine the states manually and visually identify any information related to a coherency error. This process can be very time-intensive.

Figure 4:
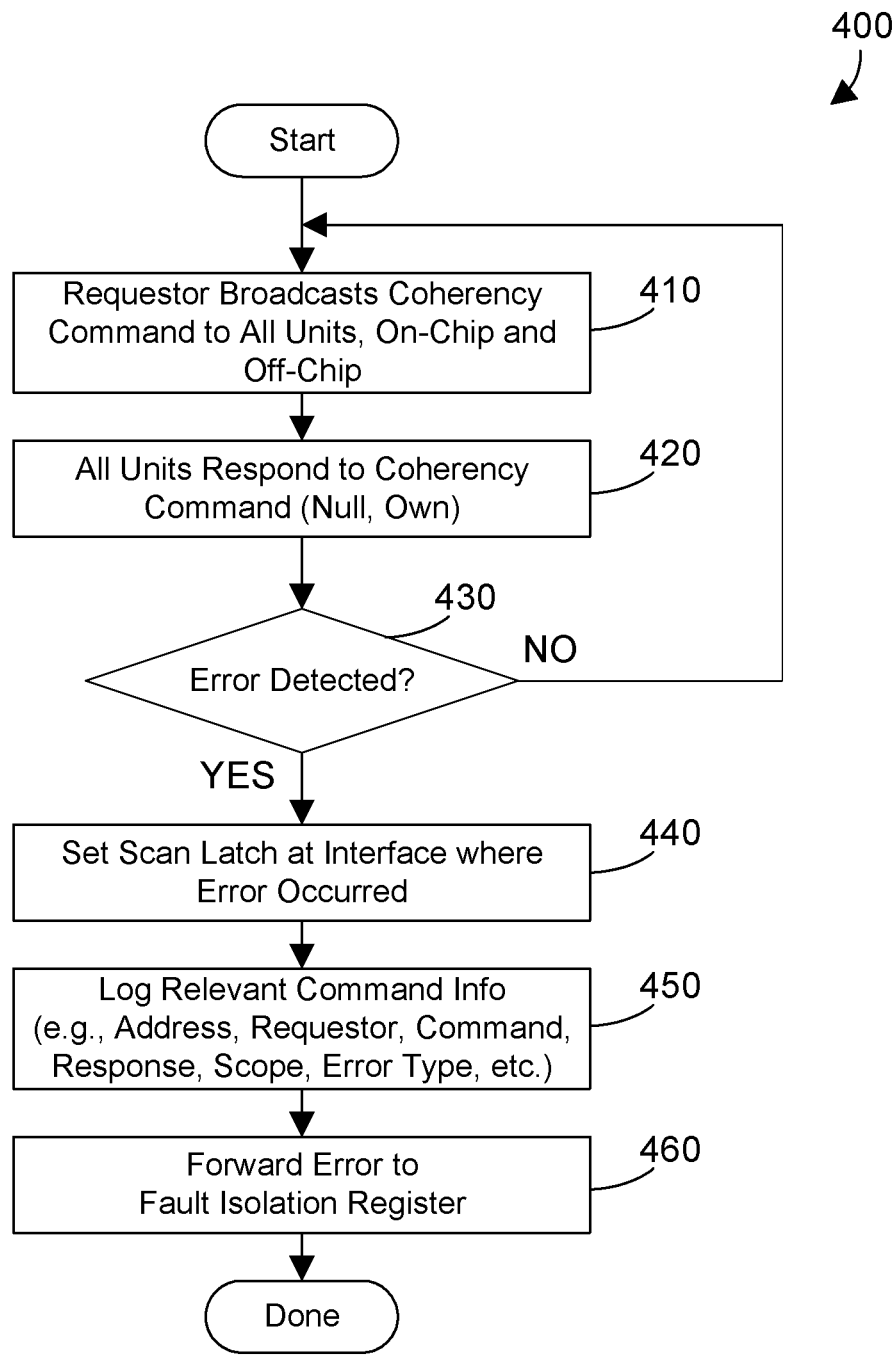
FIG. 4 is a flow diagram of a method for capturing and logging relevant command information that relates to a coherency error.

The coherency error detection and reporting mechanism disclosed and claimed herein improves on the single-bit coherency error reporting in step 250 in FIG. 2 by logging information that helps a user determine a cause for the coherency error. Referring to FIG. 4, method 400 is preferably performed by the coherency error detection and reporting mechanism 142 shown in FIG. 1. A requestor unit broadcasts a coherency command to all units, both on-chip and off-chip (step 410). The coherency command includes an address of data for which coherency needs to be determined. All units, both on-chip and off-chip, respond to the coherency command (step 420). Possible responses are null, indicating the unit does not have ownership of the address; or own, indicating the unit has ownership of the address. When the responses from all the units indicate no detected coherency error (step 430=NO), method 400 loops back to step 410 and continues. When an error is detected (step 430=YES), a scan latch it set at the interface where the error occurred (step 440). The relevant command information is logged (step 450). Relevant command information can include, without limitation, an address of the memory location; the identification of the requestor; the coherency command; the response to the coherency command; the scope of the coherency error; the error type; etc. The scope of the coherency error can include, for example, the domain in which the coherency error occurred. For example, in a system with four processors, the scope of the error might within a processor, between two of the four processors, or between all four of the processors. The error type specifies the type of coherency error, such as a conflict between two units that have the same system-addressable memory space allocated to them, or when two units have exclusive ownership of an address in memory. The error is also forwarded to a fault isolation register (step 460) so the fault may be limited to a domain where the fault is first detected. Method 400 is then done.

Figures 5, 6:
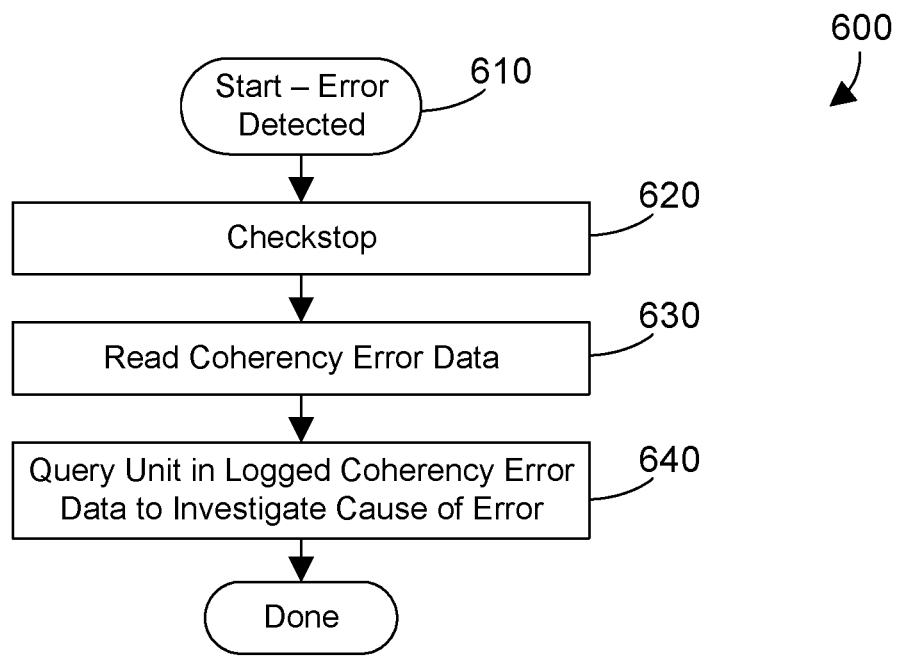
FIG. 5 is a table showing the difference between coherency error data available in a Power8 processor versus the coherency error data available with the coherency error detection and reporting mechanism disclosed herein.
FIG. 6 is a flow diagram of a method for investigating the cause of a coherency error using logged command information relating to the coherency error.

FIG. 5 shows a table that illustrates the coherency error data available in the Power8 processor architecture versus the coherency error detection and reporting mechanism 142 shown in FIG. 1. The Power8 processor logs a single bit that indicates a coherency error occurred. This is because a coherency error is detected in the coherency response merging logic, which has no knowledge of, or access to, the command information related to the failure. The coherency error detection and reporting mechanism disclosed herein, in contrast, does several different functions: 1) sets a bit at a scan latch of the interface, which identifies an interface where the coherency error occurred; 2) notifies a system error handler of the coherency error; and 3) logs relevant command information, including address, requestor, command, response, scope, error type, or other information. This is possible because the error is passed along as a member of the coherency response flow, until it reaches the combined response flow, which is where the command specifics are stored and combined with the merged coherency response to form the combined response, which is the actionable direction to both requestor and responder as to what to do next. One suitable example of a system error handler is a Fault Isolation Register, and the error can be reported to the FIR by setting a bit in the FIR. One can readily determine from the table in FIG. 5 that the coherency error data provided by the coherency error detection and reporting mechanism disclosed herein provides significantly greater information to a user, thus helping the user to more quickly determine the location and cause of a coherency error.

FIG. 6 shows a flow diagram of method 600 that could be performed by processor 100 in response to detecting a coherency error (step 610). A checkstop is performed (step 620). The coherency error data is read (step 630). Note the coherency error data read in step 630 can include any or all of the coherency error data shown in the right column in FIG. 5. The units identified in the logged coherency error data may then be queried for their state to investigate the cause of the coherency error (step 640). By providing the logged coherency error data for a coherency error, the time required by a user to identify location and cause of a coherency error is substantially shorter that using known methods. This is because the address of the command in questions is logged, so the user knows what address to look for in the caches. In addition, the user will know what caches to investigate by observing the scope/domain of the command and the location of the merge error detection point.

Some scenarios are now presented to illustrate differences between known coherency error detection in the Power8 processor architecture, and the coherency error detection described herein. In a first scenario, we assume two units on the same processor, such as two L2 caches on different cores on the same chip, respond to a requestor unit by indicating ownership of a cached copy of a line in memory. The Power8 coherency detection would not detect this error, because the merge logic in the Power8 processor has no means to forward a detected error. The coherency error detection and reporting mechanism 142, in contrast, detects the error, and in response, sets the scan latch at the interface where the error occurred, performs a checkstop, logs the relevant command information, and forwards the error to the Fault Isolation Register. The user can then read the log, determine the requestor, determine the address from the requestor, and then search all caches to see which one has the memory line and to determine the state of the caches.

In a second scenario, two units on different chips indicate a cached copy of a line in memory, such as two L2 caches on different chips. The Power8 coherency detection would detect this error, but the single bit used to communicate this error simply indicates the error occurred, and provides no information regarding how or why the error occurred. This means the user will have to look at all the active cache state machines to see if any two have the same address. The coherency error detection and reporting mechanism 142, in contrast, detects the error, and in response, sets the scan latch at the interface where the error occurred, performs a checkstop, logs the relevant command information, and forwards the error to the Fault Isolation Register. The user may then read the logged command information, determine the requestor, and determine from the requestor the address. The user can then search all of the units to see which has a cacheline with that address and determine what the cache states are.

The claims and disclosure herein provide a coherency error detection and reporting mechanism that monitors for coherency errors in a processor and between processors. When a requestor broadcasts a memory address in a command and a coherency error is detected, information regarding the command that caused the coherency error is logged, and the coherency error is reported a system error handler. The information logged for the coherency error may include the address of the coherency error, the requestor, the command, the response to the command, the scope of the coherency error, the error type, etc. Logging information relating to the coherency error provides more information to a person analyzing the processor for failures to more easily track down the cause of coherency errors.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A processor for executing software instructions, the processor comprising:
    a plurality of units that can store or modify data, the plurality of units comprising:
    a plurality of processor cores;
    a plurality of cache memories coupled to the plurality of processor cores;
    a memory controller coupled to the plurality of processor cores; and
    an interface for connecting other processors to the processor, wherein the interface comprises a scan latch;
    a coherence and data interconnect that connects the plurality of units, wherein the coherence and data interconnect comprises a coherency error detection and reporting mechanism that detects a coherency error when a requestor unit that is one of the plurality of units broadcasts a coherency command for a memory location to the plurality of units and multiple of the plurality of units report in response to the coherency command ownership of the memory location, and in response, logs command information for the coherency command that comprises which of the plurality of units reported the ownership of the memory location, wherein the coherency error detection and reporting mechanism, in response to detecting the coherency error, sets a bit in the scan latch of the interface coupled to a second processor coupled to the processor to indicate the second processor reported ownership of the memory location in response to the coherency command.

2. The processor of claim 1 wherein the command information further comprises an address of the memory location that caused the coherency error.

3. The processor of claim 1 wherein the command information further comprises a scope of the coherency error that defines a domain in which the coherency error occurred, wherein the domain comprises the processor and at least one other processor coupled to the processor via the interface.

4. The processor of claim 1 wherein the command information further comprises an error type of the coherency error.

5. The processor of claim 1 wherein, in response to the coherency error, the coherency error detection and reporting mechanism performs a checkstop for the processor that allows a user to query the logged command information.

6. The processor of claim 5 wherein, during the checkstop, the processor allows the user to query state data for the plurality of units.

7. The processor of claim 1 wherein the coherency error detection and reporting mechanism detects coherency errors at all interfaces between the units and at the interface for connecting the other processors to the processor.

8. The processor of claim 1 wherein the coherency error detection and reporting mechanism, in response to detecting the coherency error, logs the coherency error in a fault isolation register.

9. A method for handling a coherency error in a processor comprising a plurality of units that can store or modify data, the plurality of units comprising:
    a plurality of processor cores;
    a plurality of cache memories coupled to the plurality of processor cores;
    a memory controller coupled to the plurality of processor cores; and an interface for connecting other processors to the processor, wherein the interface comprises a scan latch;

providing a coherence and data interconnect that connects the plurality of units, wherein the coherence and data interconnect comprises a coherency error detection and reporting mechanism that performs the steps of:

detecting a coherency error when a requestor unit that is one of the plurality of units broadcasts a coherency command for a memory location to the plurality of units and multiple of the plurality of units report in response to the coherency command ownership of the memory location;

in response to the detected coherency error, logging command information for the coherency command that comprises which of the plurality of units reported the ownership of the memory location; and setting a bit in the scan latch of the interface coupled to a second processor coupled to the processor to indicate the second processor has ownership of the memory location.

10. The method of claim 9 wherein the command information further comprises an address of the memory location that caused the coherency error.

11. The method of claim 9 wherein the command information further comprises a scope of the coherency error that defines a domain in which the coherency error occurred, wherein the domain comprises the processor and at least one other processor coupled to the processor via the interface.

12. The method of claim 9 wherein the command information further comprises an error type of the coherency error.

13. The method of claim 9 wherein, in response to the coherency error, performing a checkstop for the processor that allows a user to query the logged command information.

14. The method of claim 13 wherein, during the checkstop, allowing the user to query state data for the plurality of units.

15. The method of claim 9 further comprising detecting coherency errors at all interfaces between the units and at the interface for connecting the other processors to the processor.

16. The method of claim 9 wherein the coherency error detection and reporting mechanism, in response to detecting the coherency error, logs the coherency error in a fault isolation register.

17. A processor for executing software instructions, the processor comprising:
a plurality of units that can store or modify data, the plurality of units comprising:
a plurality of processor cores;
a plurality of cache memories coupled to the plurality of processor cores;
a memory controller coupled to the plurality of processor cores; and
an interface for connecting other processors to the processor;
a coherence and data interconnect that connects the plurality of units, wherein the coherence and data interconnect comprises a coherency error detection and reporting mechanism that detects a coherency error when a requestor unit that is one of the plurality of units broadcasts a coherency command for a memory location to the plurality of units and multiple of the plurality of units report in response to the coherency command ownership of the memory location, and in response, logs command information for the coherency command, wherein the logged command information comprises:
which of the plurality of units reported the ownership of the memory location;
an address of the memory location that caused the coherency error;
a scope of the coherency error; and
an error type of the coherency error;
wherein the coherency error detection and reporting mechanism, in response to detecting the coherency error, sets a bit in a scan latch of an interface to another processor where the coherency error was detected and logs the coherency error in a fault isolation register; and
in response to the coherency error, the coherency error detection and reporting mechanism performs a checkstop for the processor that allows a user to query the logged command information and to query state data for the plurality of units.

18. The processor of claim 17 wherein the coherency error detection and reporting mechanism detects coherency errors at all interfaces between the units and at the interface for connecting the other processors to the processor.

* * * * *